(12) United States Patent
Matsuda (10) Patent No.: US 6,168,543 B1
(45) Date of Patent: Jan. 2, 2001

(54) SILENT CHAIN AND SPROCKET HAVING TEETH WITH MATCHING CURVED SURFACES

(75) Inventor: Akio Matsuda, Nabari (JP)

(73) Assignee: Borg-Warner Automotive K.K. (JP)

(*) Notice: Under 35 U.S.C. 154(b), the term of this patent shall be extended for 0 days.

(21) Appl. No.: 09/203,021

(22) Filed: Dec. 1, 1998

(30) Foreign Application Priority Data

Dec. 29, 1997 (JP) .................................................. 9-368228

(51) Int. Cl.⁷ ............................... F16H 7/06; F16G 13/04
(52) U.S. Cl. .......................................... 474/157; 474/213
(58) Field of Search ................................. 474/153, 155, 474/156, 157, 202, 206, 212, 213, 226, 228

(56) References Cited

U.S. PATENT DOCUMENTS

| | | |
|---|---|---|
| 1,560,647 | 11/1925 | Belcher . |
| 1,598,906 | * 9/1926 | Dull .................................... 474/214 |
| 3,316,771 | * 5/1967 | Nichols ................................ 474/212 |
| 3,377,875 | 4/1968 | Sand ................................... 74/229 |
| 3,636,788 | 1/1972 | Jeffrey ................................. 74/250 |
| 4,759,740 | * 7/1988 | Cradduck ............................. 474/212 |
| 4,854,925 | * 8/1989 | Chandrupatla ....................... 474/212 |
| 4,915,675 | 4/1990 | Avramidis ............................ 474/213 |
| 5,154,674 | 10/1992 | Auramidis et al. ................... 474/214 |
| 5,236,400 | 8/1993 | Tsuyama ............................. 474/217 |
| 5,267,910 | 12/1993 | Maruyama et al. .................. 474/212 |
| 5,419,743 | 5/1995 | Takeda et al. ....................... 474/157 |
| 5,628,702 | 5/1997 | Kotera ................................. 474/213 |
| 5,848,948 | 12/1998 | Allen .................................... 474/156 |
| 5,974,673 | * 11/1999 | Sundstrom ........................... 474/157 |
| 5,989,140 | * 11/1999 | Ichikawa et al. .................... 474/212 |

FOREIGN PATENT DOCUMENTS

| | | | |
|---|---|---|---|
| 0284859 | 10/1988 | (EP) | .............................. F16G 55/30 |
| 0284860 | 10/1988 | (EP) | .............................. F16G 13/04 |
| 443581 | 9/1912 | (FR) . | |
| 230839 | * 3/1925 | (GB) | ................................... 474/157 |
| 2-278040 | 11/1990 | (JP) . | |

OTHER PUBLICATIONS

European Search Report dated May 6, 1999 for 98310560.2.

* cited by examiner

Primary Examiner—David A. Bucci
Assistant Examiner—Matthew A. Kaness
(74) Attorney, Agent, or Firm—Sidley & Austin; Greg Dziegielewski

(57) ABSTRACT

A silent chain and sprocket system for power transmission that includes a toothed sprocket and a chain with multiple links. At each point of engagement between the sprocket teeth and the chain link teeth, the sprocket teeth have a curved surface that makes contact with a curved surface on the chain link teeth.

3 Claims, 8 Drawing Sheets

PRIOR ART

SILENT CHAIN AND SPROCKET HAVING TEETH WITH MATCHING CURVED SURFACES

BACKGROUND OF THE INVENTION

The present invention relates to a silent chain power transmission device. Such devices are used in automotive transmissions, transfer cases, engine timing systems, and the like. More specifically, the present invention relates to a silent chain power transmission device in which the sprocket teeth have a curved surface that makes contact with a curved surface on the link plate teeth at each point of engagement. The result is an increase in surface area of the engagement between the link plate teeth and the sprocket teeth, which in turn reduces the contact surface pressure and improves the overall durability as compared with conventional silent chain power transmission devices.

Silent chain transmission devices are formed by an arrangement of link plates in lateral and longitudinal directions. The links are interlaced and joined, forming a chain that is used in conjunction with a sprocket. A typical chain is composed of inner links, which contact the teeth of the sprocket to provide power transmission, and guide links, which do not provide power transmission. Guide links are employed to maintain the chain on the center of the sprocket. A row of link plates, arranged in the lateral direction, typically has a number of inner links combined with guide links in the center or at both edges of the row.

Conventional silent chain transmission devices face durability problems. In the conventional device, power is transmitted by the contact of the flat or convex surface of the link plate with the convex surface of the sprocket teeth. Thus, both surfaces experience wear due to high contact surface pressure. As a result, the durability of the power transmission device is decreased. The present invention is directed at solving this problem. It decreases the wear on the link plates and sprocket teeth by increasing the surface area of the contact between them.

SUMMARY OF THE INVENTION

The object of the present invention is to increase the durability of silent chain power transmission devices. The area of contact between the link plate teeth and the sprocket teeth is increased in surface area. This increase is accomplished by curving the surfaces of both the link plate tooth and the sprocket tooth at the location of contact. The link plate teeth and the sprocket teeth thereby cradle into each other. The increase in surface area of the contact location results in lower contact pressure and thus increased durability of the device.

The silent chain and sprocket system that a preferred embodiment of the present invention comprises has multiple link plates joined by pins inserted into apertures in the link plates. Each of the link plates has teeth that are curved, either concavely or convexly, on either their inside flanks or their outside flanks. In addition, the system's sprocket has multiple teeth that have curved surfaces for engagement with the link plates.

U.S. Pat. No. 5,154,674 to Avramidis and Ledvina also teaches curved link plate teeth. Unlike the present invention, however, the '674 patent teaches link plates that are asymmetrical in order to modify the noise pattern of the chain they comprise. In contrast, the present invention teaches symmetrical link plates in order to increase link plate durability.

For a better understanding of the invention, reference should be made to the following detailed description taken in conjunction with the accompanying drawings.

BRIEF DESCRIPTION OF THE INVENTION

In the drawings, which are not to scale.

DETAILED DESCRIPTION OF THE PREFERRED EMBODIMENTS

The present invention is explained below in greater detail with reference to the attached figures.

Figure 1:
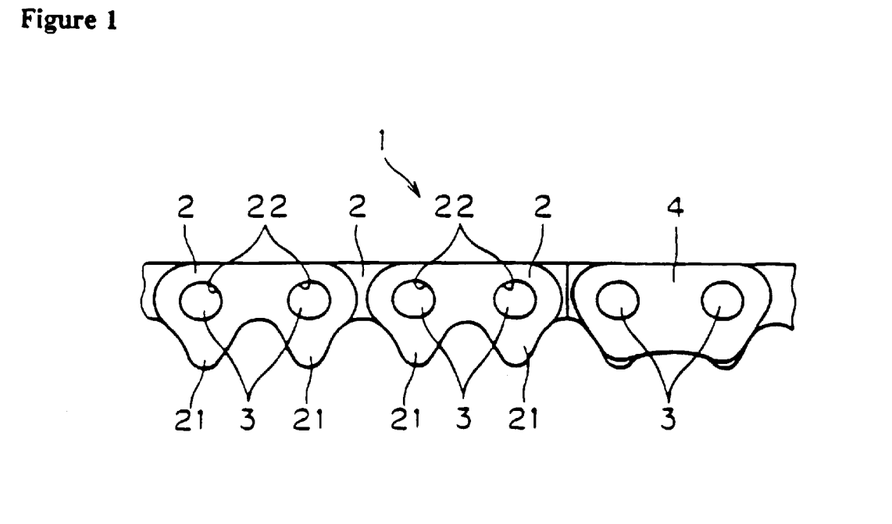
FIG. 1 is a partially cut front elevational view of a silent chain composing one embodiment of the present invention.
Figure 2:
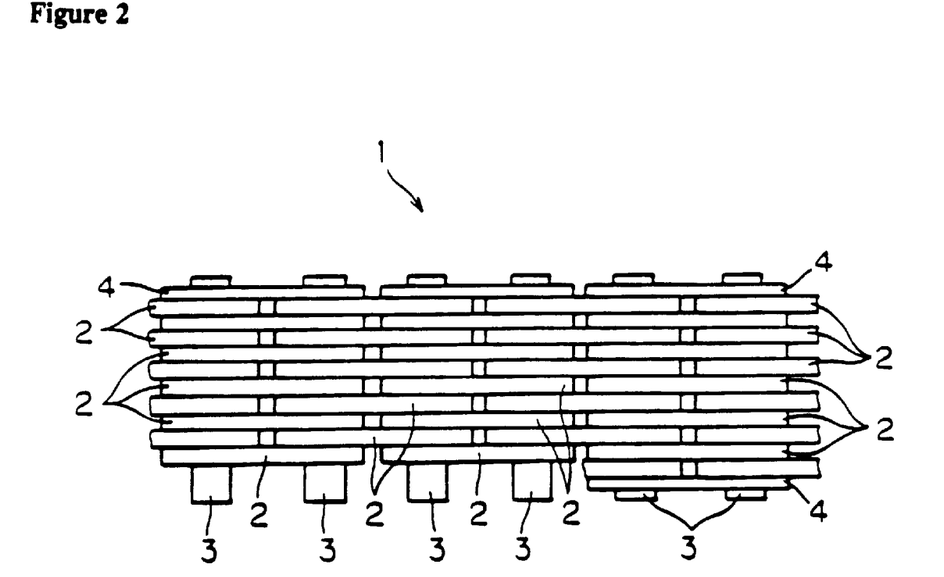
FIG. 2 is a top plan view of the silent chain of FIG. 1.

FIG. 1 is a partially cut front elevational view of a silent chain that comprises one embodiment of the present invention; FIG. 2 is the corresponding plan view. In both FIG. 1 and FIG. 2, silent chain 1 has multiple link plates 2, each with a pair of teeth 21 and apertures or pinholes 22. Link plates 2 are connected by insertion of connecting pins 3 into pinholes 22 of link plate 2. Guide links 4 are attached to the outermost link plates 2.

Figure 3:
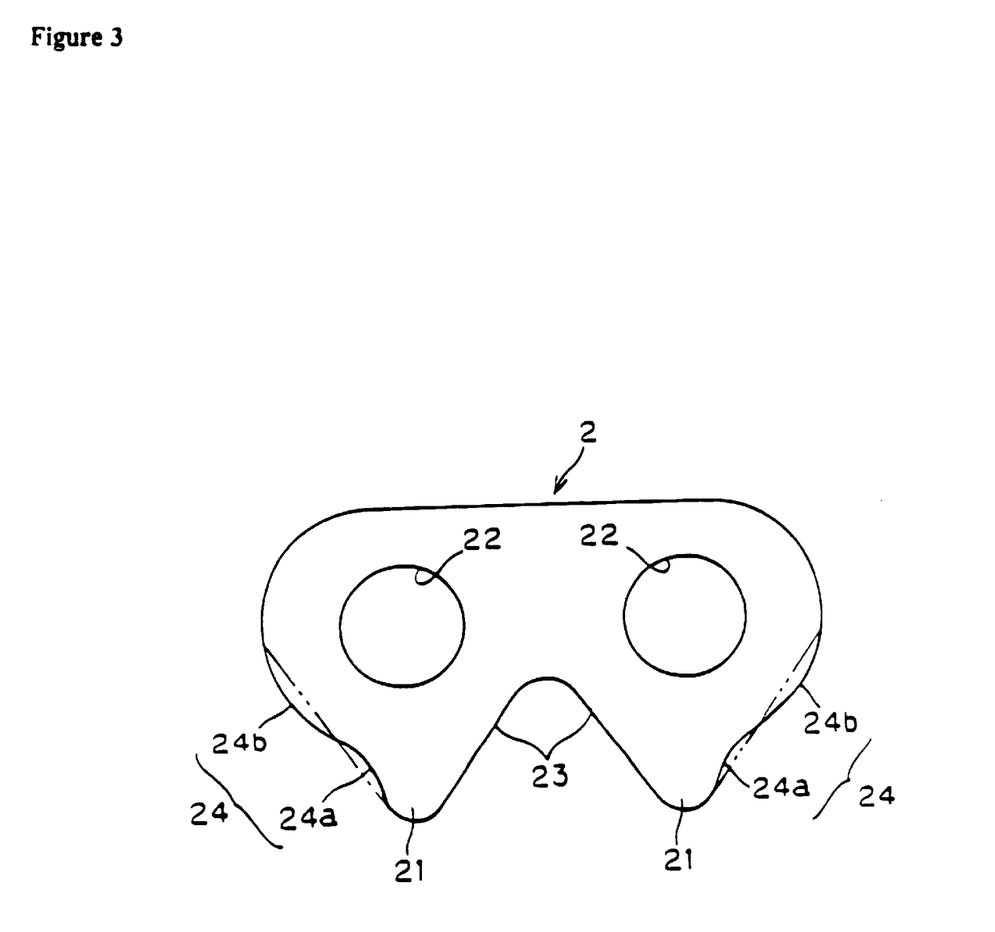
FIG. 3 is a front elevational view of a link plate that is part of the silent chain of FIG. 1.

FIG. 3 is a front elevational view of a link plate that is part of the silent chain of FIG. 1. Each tooth 21 of link plate 2 comprises inside flank 23 and outside flank 24. Inside flank 23 has a nearly straight flat surface or slightly curved surface. Outside flank 24 has a concave surface 24a near the tip of tooth 21 and convex surface 24b that is near pinhole 22. The dotted lines show the conventional, nearly-straight outside flank.

Figure 4:
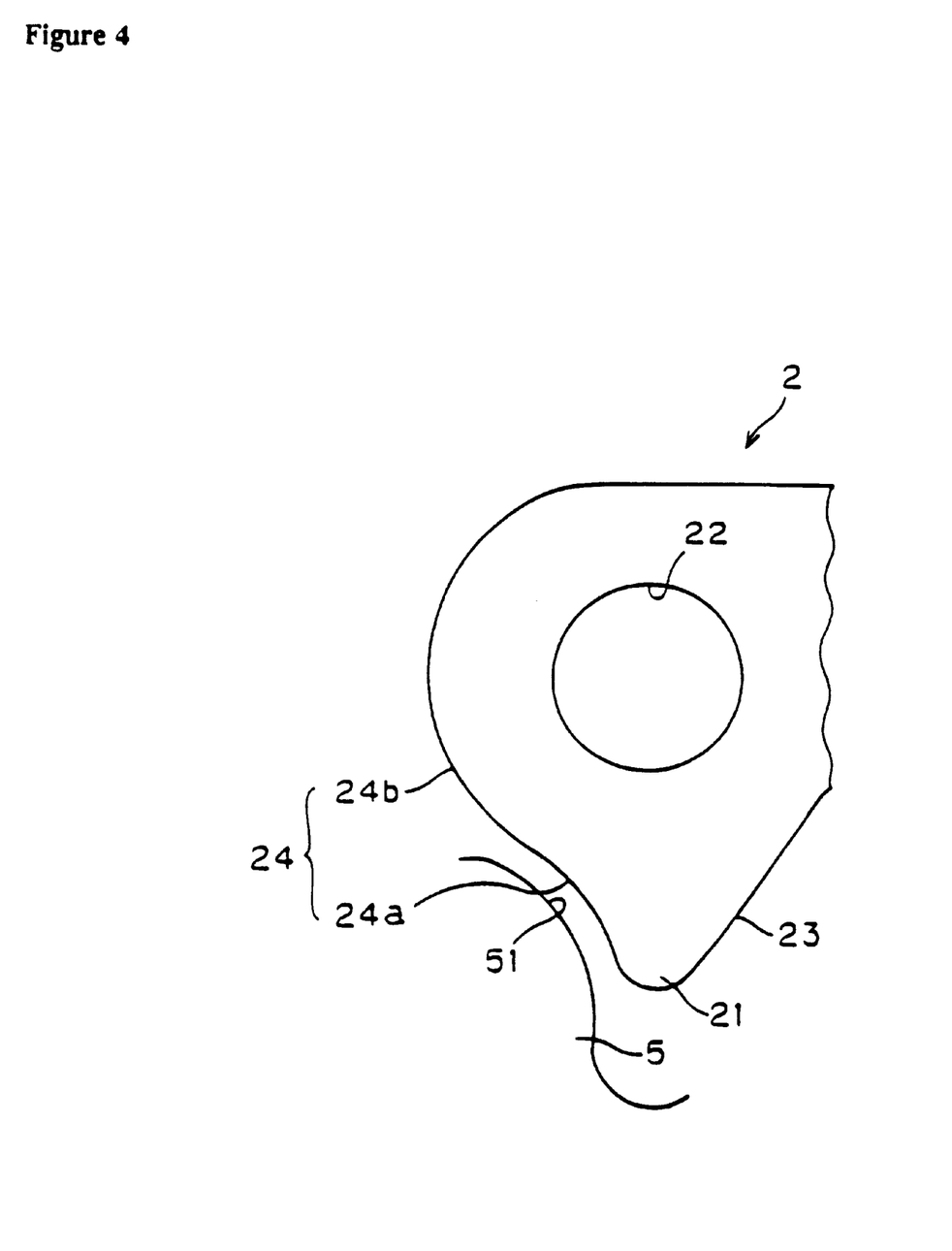
FIG. 4 is a front elevational view of the area of engagement of the link plate of FIG. 3 with a sprocket.

FIG. 4 is a front elevational view of the area of engagement of the link plate of FIG. 3 with a sprocket. Sprocket tooth 5 makes contact with concave surface 24a on the outside flank of link plate 2. Sprocket tooth 5 has convex surface 51, which corresponds to concave surface 24a. The engagement between outside flank 24 of link plate 2 and sprocket tooth 5 is via the contact between concave surface 24a and convex surface 51, so that the contact surface pressure on both surfaces is reduced and the durability of the device is improved.

Figure 5:
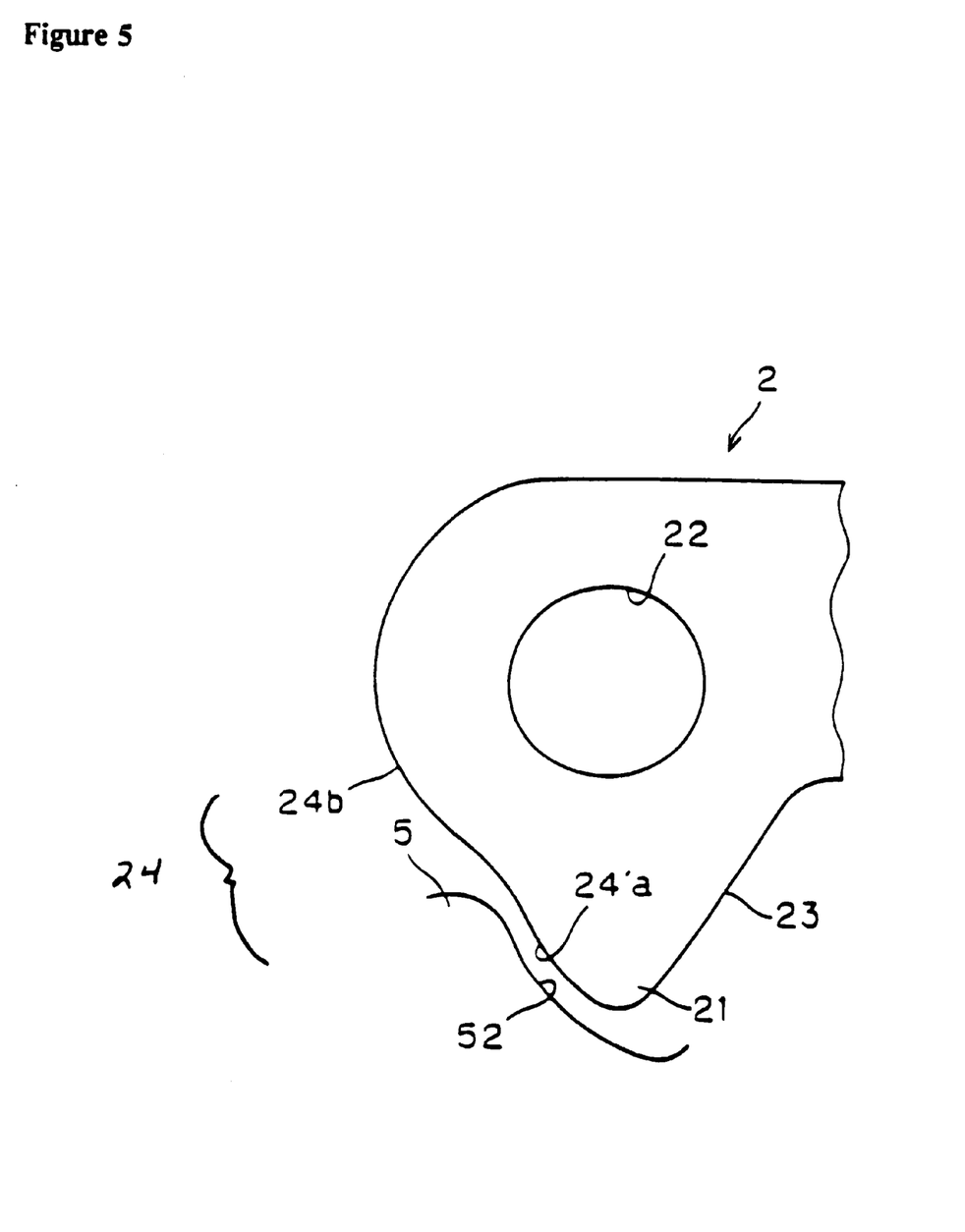
FIG. 5 is a front elevational view of the area of engagement of a link plate with a sprocket in an alternative embodiment of the present invention.

FIG. 5 is a front elevational view of the area of engagement of a link plate with a sprocket in an alternative embodiment of the present invention. Outside flank 24 of link plate 2 has convex surface 24'a near the tip of tooth 21. In addition, sprocket tooth 5 has corresponding concave surface 52. As in the embodiment of FIG. 4, engagement between link plate 2 and sprocket tooth 5 is achieved via contact between a concave surface and a convex surface, so that the contact surface pressure on the inside flank of link plate 2 and the sprocket tooth is reduced and durability of the device is improved.

Figure 6:
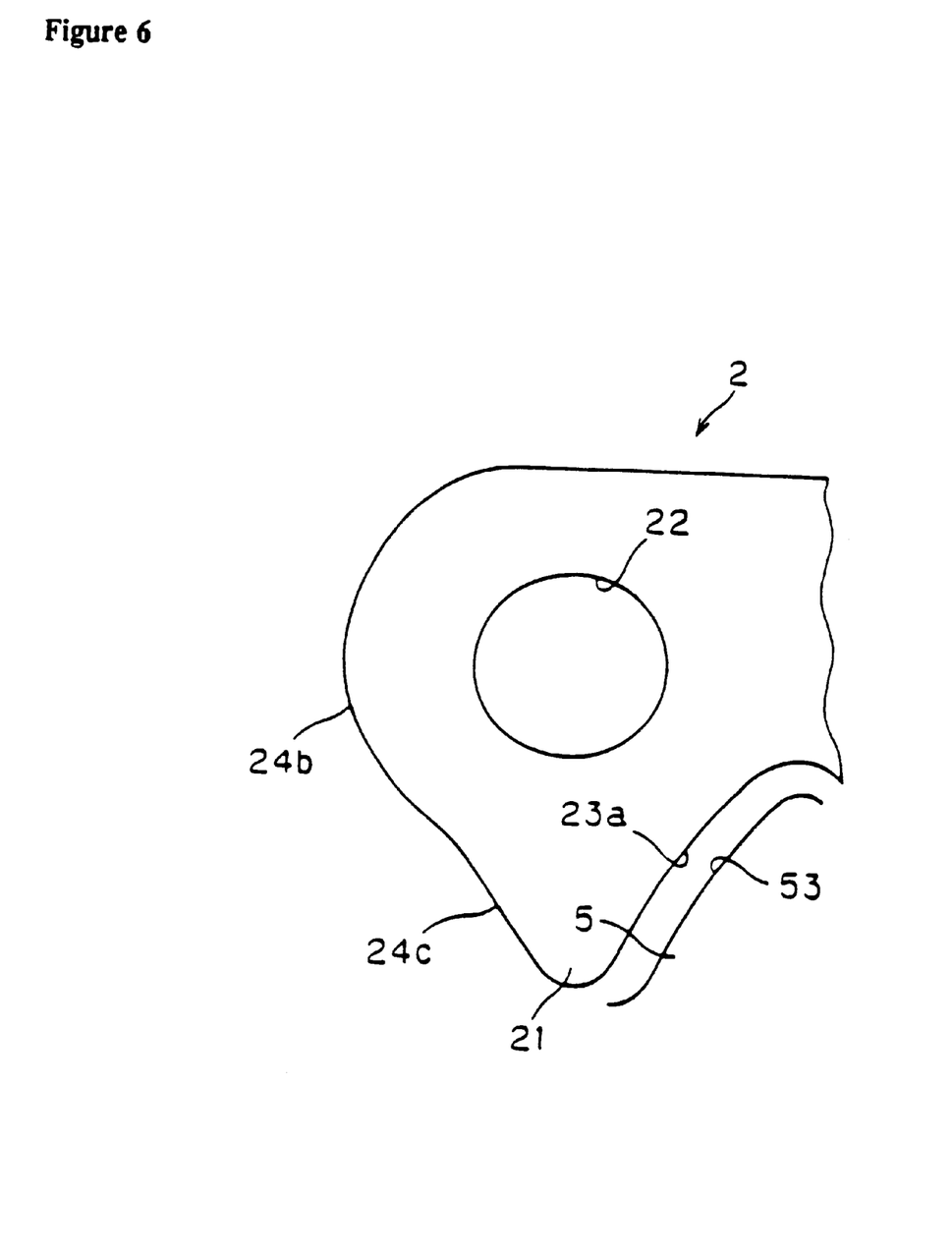
FIG. 6 is a front elevational view of the area of engagement of a link plate with a sprocket in a second alternative embodiment of the present invention.

FIG. 6 is a front elevational view of the area of engagement of a link plate with a sprocket in a second alternative embodiment of the present invention. The inside flank of link plate 2 has concave surface 23a, and sprocket tooth 5 has corresponding convex surface 53. Convex curved surface 24b and nearly straight surface 24c are formed on the outside flank. In this embodiment, as in the other embodiments, engagement between link plate 2 and sprocket 5 is via the contact between the concave surface and the convex surface so that the contact surface pressure between the inside flank of link plate 2 and the sprocket tooth is reduced, and the overall durability of the device is improved.

Figure 7:
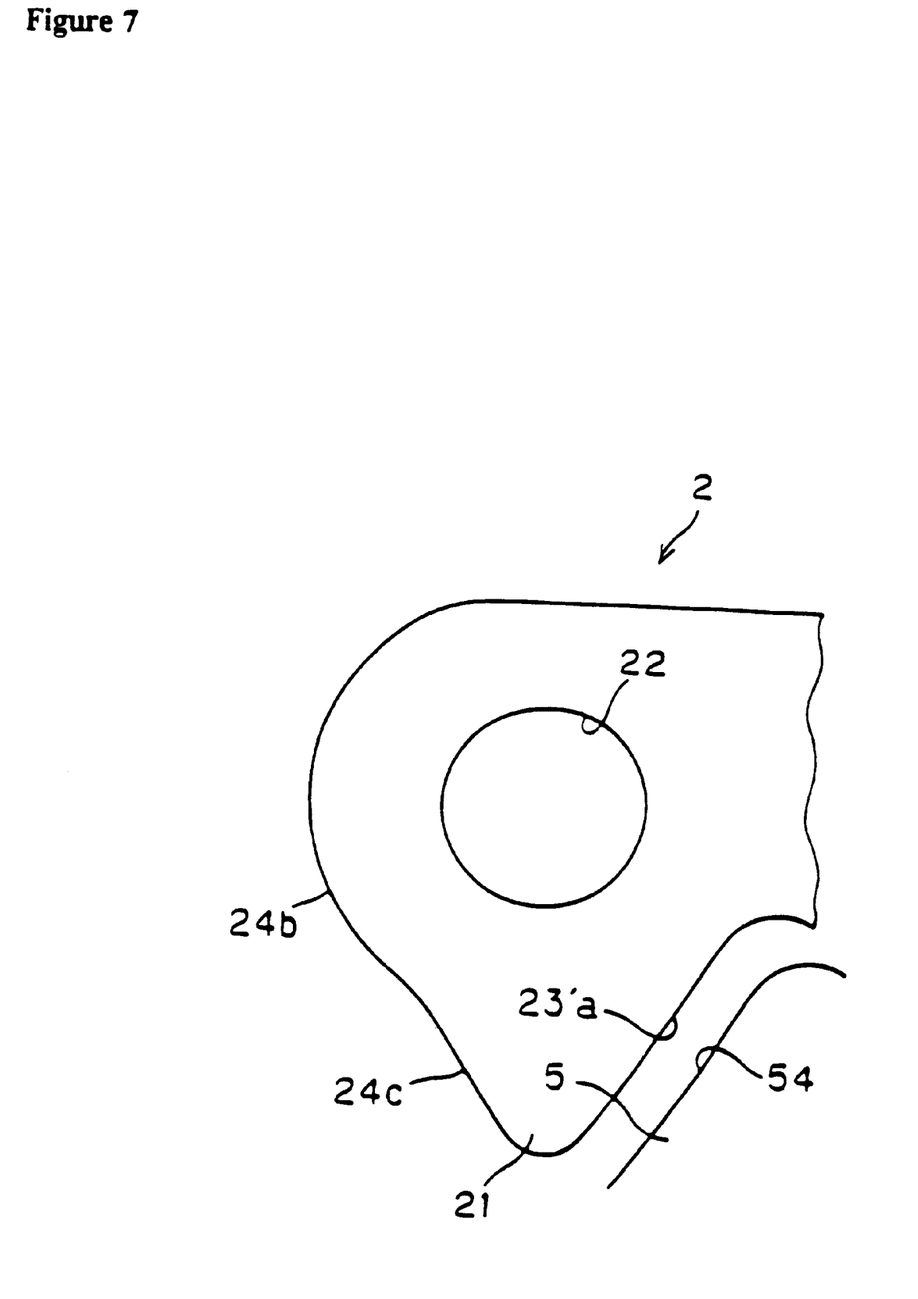
FIG. 7 is a front elevational view of the area of engagement of a link plate with a sprocket in a third alternative embodiment of the present invention.

FIG. 7 is a front elevational view of the area of engagement of a link plate with a sprocket in a third alternative embodiment of the present invention. The inside flank of link plate 2 has convex surface 23'a. In addition, sprocket tooth 5 has corresponding concave surface 54. Convex curved surface 24b and nearly straight surface 24c are formed on the outside flank. Convex curved surface 24b is formed near a pinhole on the outside flank so that the material thickness near the pinhole of link plate 2 is increased so that the strength of the link plate is thereby increased. As in the above embodiments, engagement between link plate 2 and sprocket 5 is via the contact between the concave surface and the convex surface, so that the contact surface pressure between the inside flank of link plate 2 and the sprocket tooth is reduced, and the overall durability of the device is improved.

Figure 8:
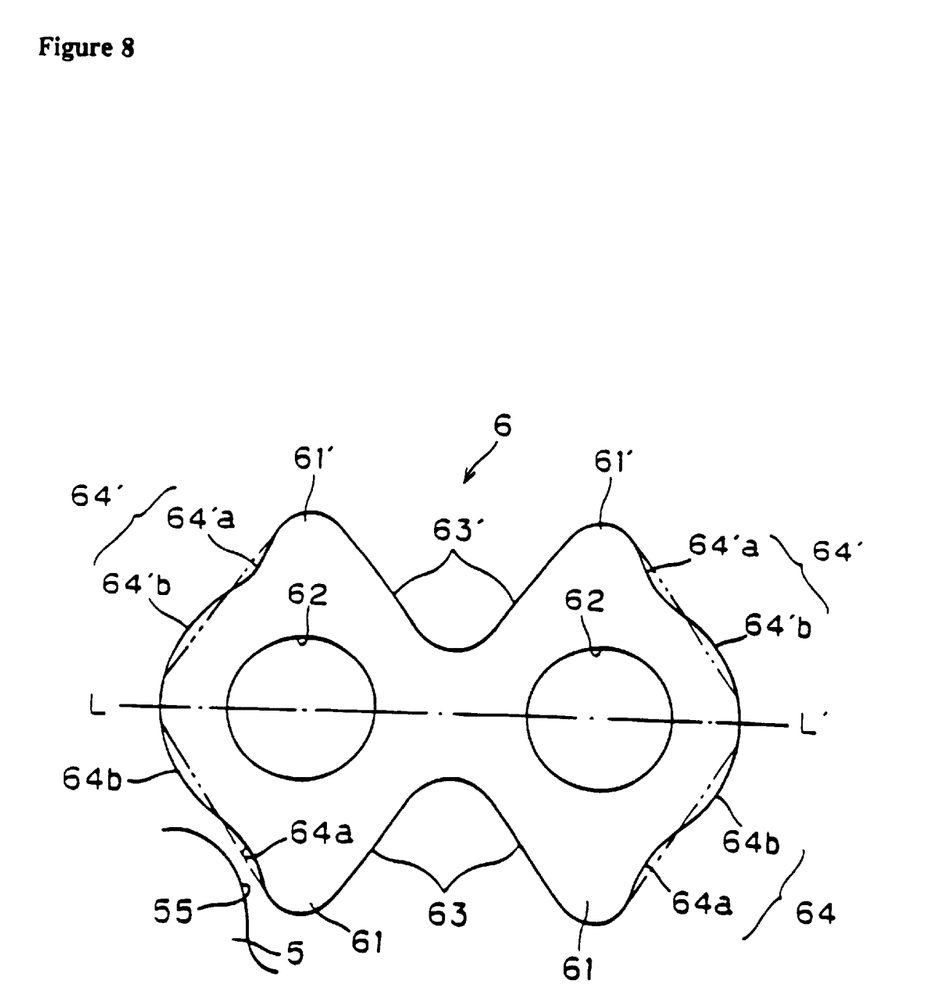
FIG. 8 is a front elevational view of a link plate and the area of engagement between the link plate and a sprocket in a fourth alternative embodiment of the present invention.

FIG. 8 is a front elevational view of a link plate and the area of engagement between the link plate and a sprocket in a fourth alternative embodiment of the present invention. A link plate of a back-driving silent chain is shown. Link plate 6 has teeth 61, 61' on both sides of center line L–L'. Tooth 61 comprises inside flank 63 and outside flank 64; tooth 61' comprises inside flank 63' and outside flank 64'. Inside flanks 63, 63' have a straight or slightly curved surface. Outside flank 64 has concave surface 64a on the lower portion of tooth 61 and convex surface 64b near pinhole 62. Outside flank 64' has concave surface 64'a on the upper portion of tooth 61' and convex surface 64'b near pinhole 62. The dotted lines show the surfaces of a conventional outside flank. Sprocket 5 has convex surface 55, which engages with concave surface 64a on outside flank 64 of link plate 6. A similar engagement takes place between a second sprocket, not shown, and outside flank 64' of link plate 6. Thus, the engagement between link plate 6 and the sprockets is via contact between a concave surface and a convex surface, thereby reducing the contact surface pressure and improving the durability of the device. The present invention could also be practiced by modifying FIG. 8 so that the sprocket has a concave surface and the corresponding flank of the link plate has a convex surface. Similarly, the area of engagement with the sprocket could be the inside flank of the link plate, in which case the inside flank would be concave or convex, depending on the curvature of the sprocket tooth.

Figure 9:
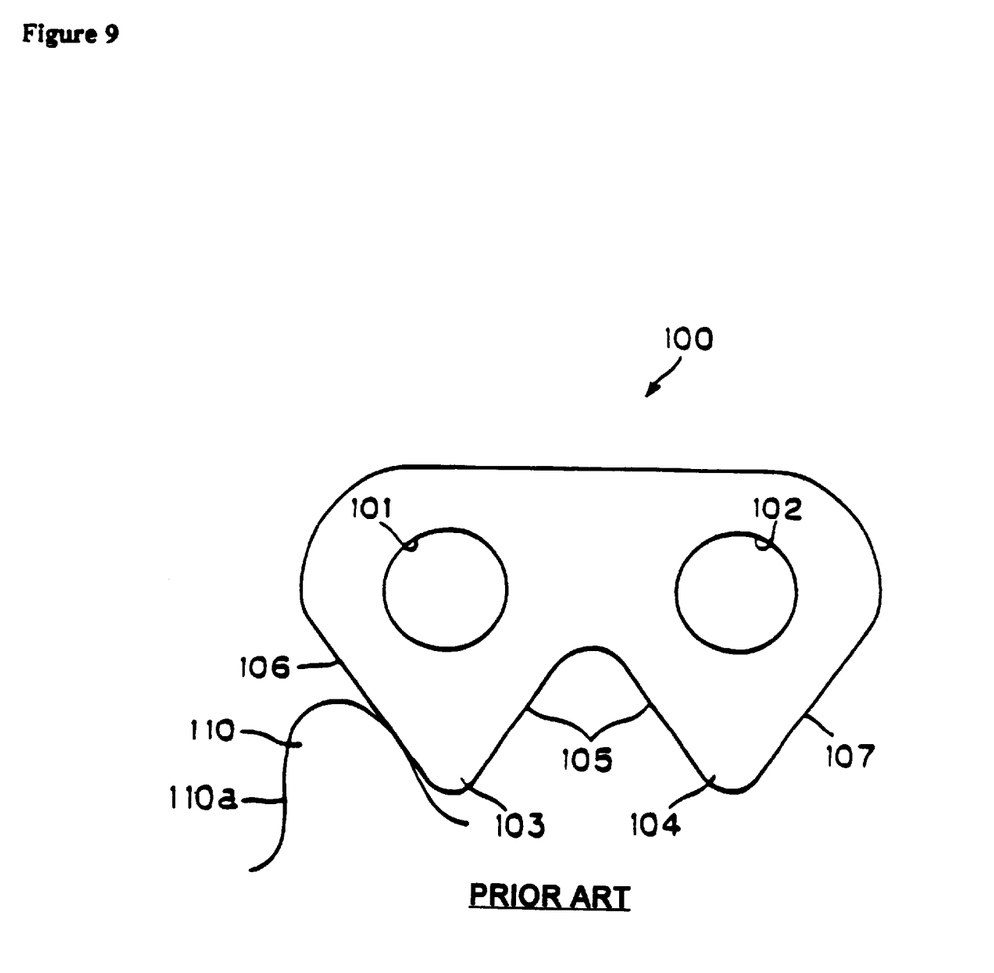
FIG. 9 is a front elevational view of a link plate and the area of engagement between the link plate and a sprocket in a conventional silent chain power-transmission device.

FIG. 9 is a front elevational view of a link plate and the area of engagement between the link plate and a sprocket in a conventional silent chain power-transmission device. In the figure, link plate 100 has a pair of pinholes 101, 012 for insertion of the connecting pin and a pair of teeth 103, 104 which mesh with sprocket 10. Tooth 103 is composed of inside flank 105 and outside flank 106 and tooth 104 is composed of inside flank 105 and outside flank 107. Inside flank 105 is composed of a slightly curved surface and outside flanks 106, 107 are composed of a nearly straight, flat surface. The teeth of sprocket 110 that mesh with outside flanks 106, 107 are composed of a convex curved surface 110a, such as an involute curve.

Those skilled in the art to which the invention pertains will be able to make modifications and other employing the principles of this invention without departing from its spirit or essential characteristics, particularly upon considering the foregoing teachings. The described embodiments are to be considered in all respects only as illustrative and not restrictive, and the scope of the invention is, therefore, indicated by the appended claims rather than by the foregoing description. Consequently, while the invention has been described with reference to particular embodiments, modifications of structure, sequence, materials and the like would be apparent to those skilled in the art and fall within the scope of the invention.

What is claimed is:

1. A silent chain and sprocket power transmission system comprising:

a silent chain having a plurality of link plates, each of said link plates containing a pair of apertures and a horizontal centerline drawn between said apertures, said link plates being connected together by pivot members including round pins inserted into said apertures, each of said link plates having a plurality of teeth, each of said teeth including an inside flank and an outside flank, each of said outside flanks having a concave curved surface adjacent a tip portion of said tooth, each said outside flank having an outwardly protruding convex surface protruding in a direction outward from said outside flank and extending between said concave curved surface and a location on said outside flank intersecting said horizontal centerline; and a sprocket, said sprocket having a plurality of teeth about its periphery, each of said teeth of said sprocket having a curved surface complementary to said concave curved surface, said curved surfaces of said sprocket teeth matching and engaging said concave curved surfaces of said outside flanks of said link plates to provide a transmission of power therebetween.

2. The system of claim 1, wherein said apertures divide said link plates into an upper portion and a lower portion, each of said link plates including a pair of teeth of said upper portion of said link plates and a pair of teeth of said lower portion of said link plates.

3. The system of claim 1, wherein said sprocket tooth curved surface is a convex surface for engagement with said concave curved surface of said outside flank.

\* \* \* \* \*